April 26, 1966     M. W. LUTHER     3,247,708
CONTINUOUS STREAM ANALYZER
Filed Jan. 10, 1963     4 Sheets-Sheet 1
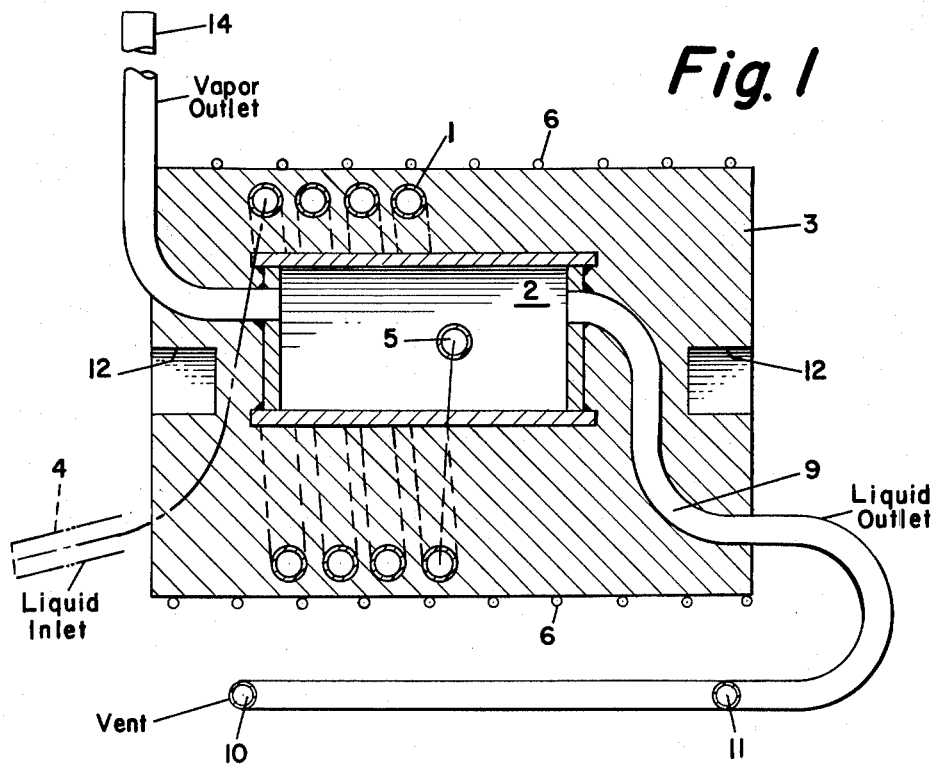
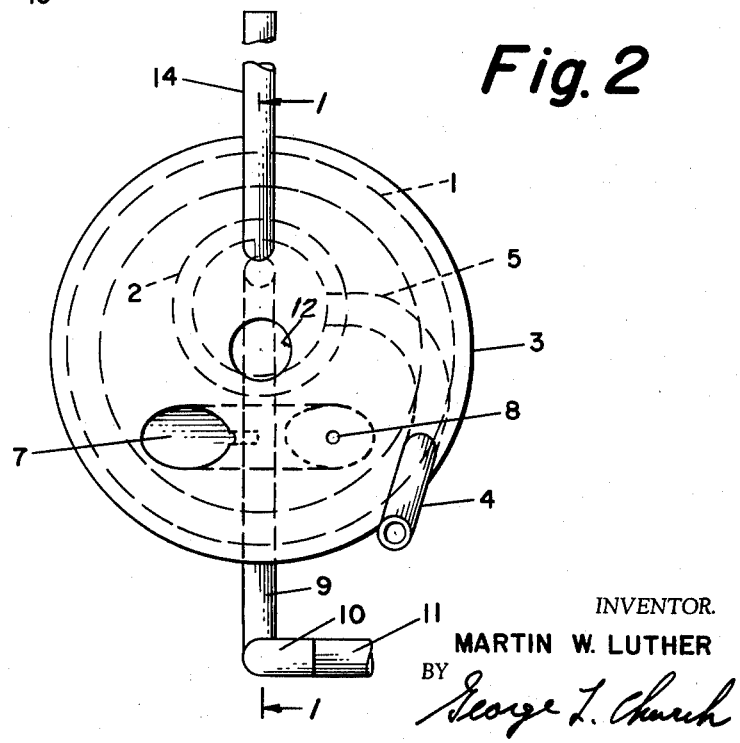
INVENTOR.
MARTIN W. LUTHER
BY George L. Church
ATTORNEY April 26, 1966 M. W. LUTHER 3,247,708
CONTINUOUS STREAM ANALYZER
Filed Jan. 10, 1963 4 Sheets-Sheet 2

Fig. 3

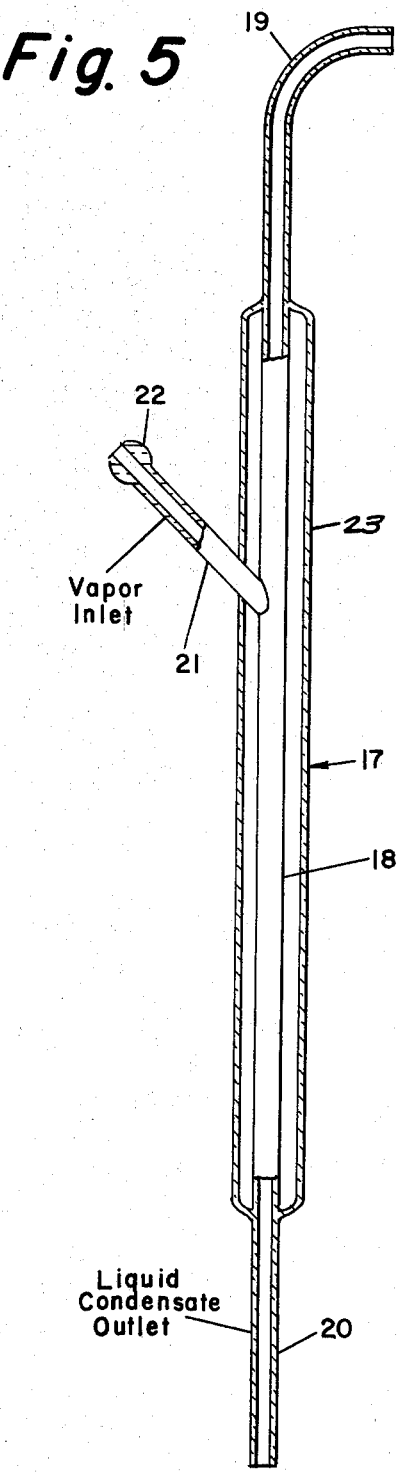
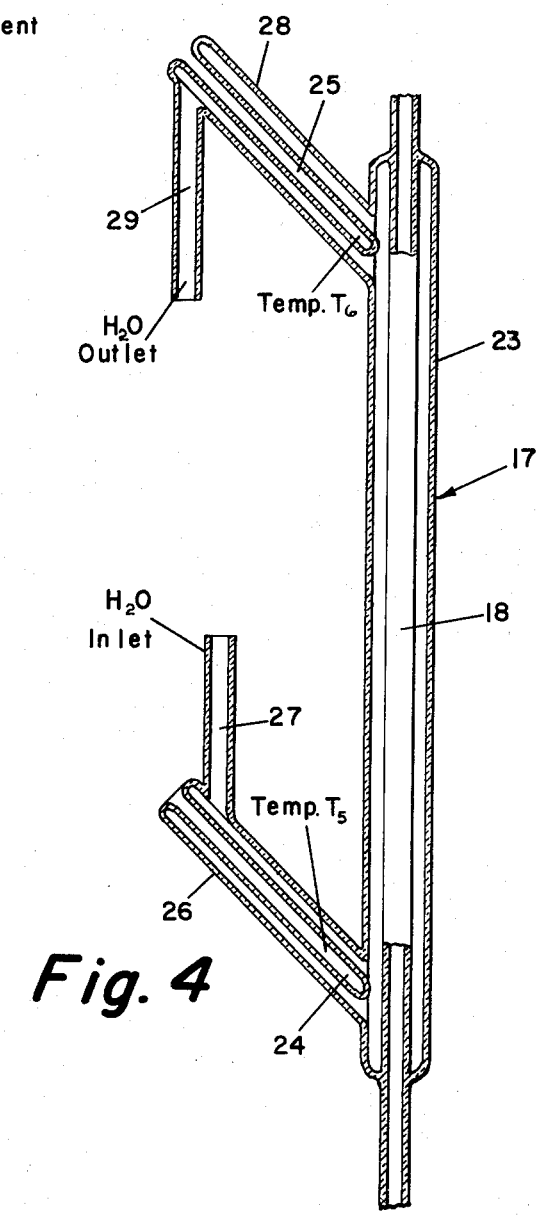

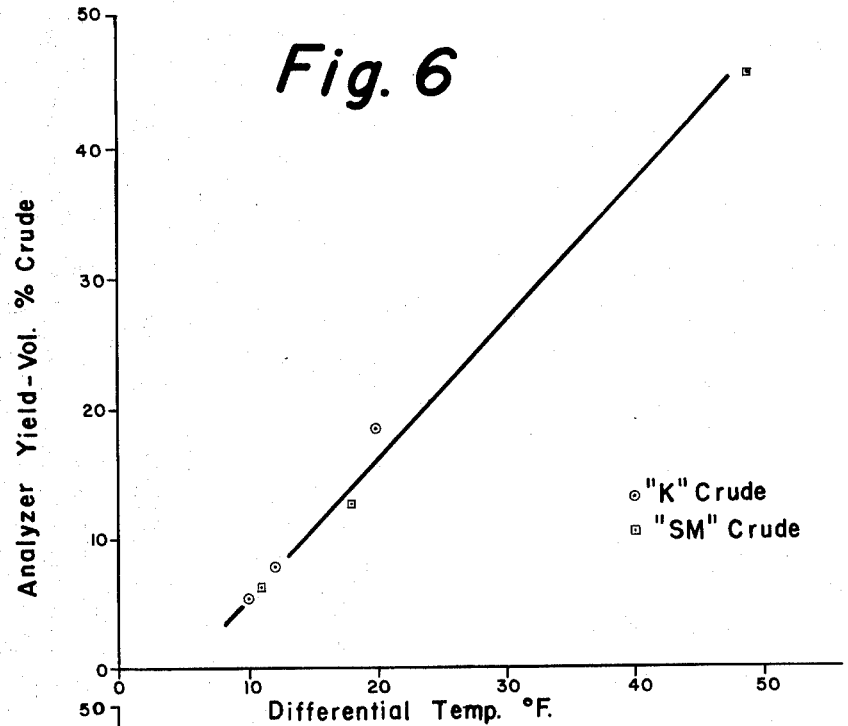
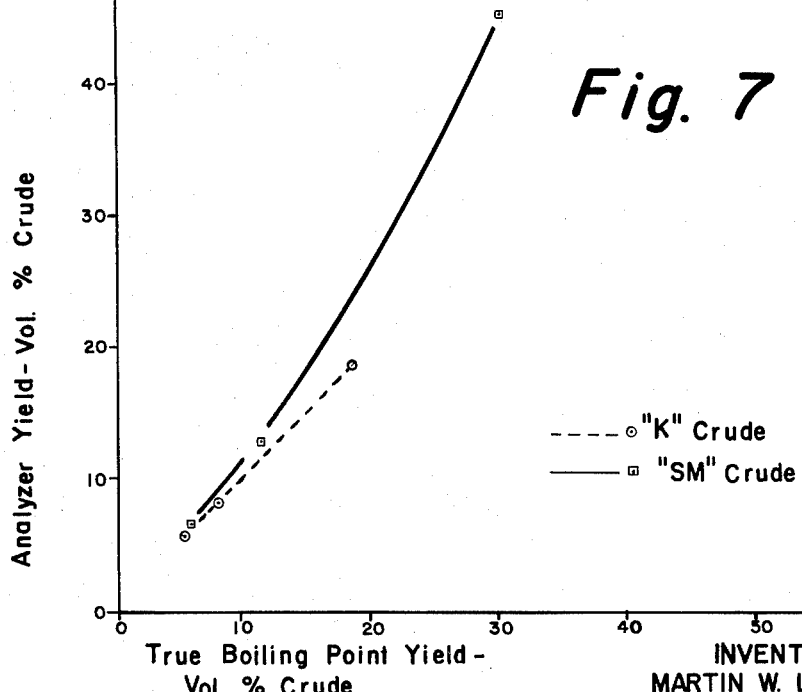

United States Patent Office 3,247,708
Patented Apr. 26, 1966

3,247,708
CONTINUOUS STREAM ANALYZER
Martin W. Luther, Glen Mills, Pa., assignor to Sun Oil Company, Philadelphia, Pa., a corporation of New Jersey
Filed Jan. 10, 1963, Ser. No. 250,695
2 Claims. (Cl. 73—53)

This invention relates to a continuous analyzer for a flowing stream, and more particularly to an analyzer fed from a flowing stream of crude petroleum and reading out the yields which may be expected from a plant (petroleum refinery) distillation of the crude petroleum.

The main advantage of the continuous crude analyzer of this invention lies in the economic gain realized from a reduction in the amount of "off specification" products. Consider a crude petroleum distillation unit which is being charged with crude petroleum and which is producing, by fractionation, a variety of products such as gasoline, naphtha, furnace oil, gas oil, and residum. The distillate products are usually manufactured to certain specifications with respect to boiling range, as determined by American Society for Testing Materials (ASTM) laboratory distillations. The products are maintained "on specification" by adjustment of flows, temperatures, and pressures for proper operation of the distillation unit.

From a particular kind of crude petroleum, the distillate fractions are produced at certain yields which are characteristic of the relative abundance of the various fractions in the crude. It may be stated that yield changes are caused by changes in the composition of the crude petroleum stream. That is to say, if a change occurs in the composition of the petroleum, such as the inclusion of more or less of a particular crude component in the mixture or blend of crudes charged to the fractionation tower, there may result a change in the yields of the products distilled from the crude petroleum. Since the product specifications remain the same, the changes in crude composition must be compensated by altering the aforementioned flows, temperatures, and pressures to produce yields commensurate with the occurrence of the various fractions in the crude.

Usually, a change in the composition of the crude petroleum is brought to the attention of the operator of the distillation unit by changes in observed operating conditions, which are followed by departures from the desired specifications. Because he does not know the magnitude of the compensation and exactly when to apply it, the operator is forced to get back "on specification" by numerous changes in the operating conditions, made on a "cut and try" basis. This consumes time, and produces "off test" products which must be rerun with attendant losses in production and increased utility costs.

One function of the continuous crude analyzer of this invention is to advise the plant operator of the yields which he can except, from a crude stream which is changing in composition from time to time. Speaking generally, the analyzer produces a signal which is recorded by a differential temperature recorder; a change in the magnitude of this signal will correlate with a change in the yields of distillate products which may be anticipated from a plant (petroleum refinery) distillation of the crude petroleum stream.

The continuous crude analyzer of this invention can function also as an anticipatory sensing element, which can be employed in conjunction with other controllers to change various set points in accordance with the requirements imposed by changes in crude composition.

There will now be presented a brief description of what is involved in the analyzer of this invention. The crude flows through three cascaded stages each of which makes a liquid-vapor separation at a respective fixed and controlled temperature. The rate of production of vapor in each stage is measured by feeding the vapor from each stage to a respective heat exchanger, metering the cooling water fed to the exchangers, and measuring the water temperature differential developed in the respective exchangers.

A detailed description of the invention follows, taken in conjunction with the accompanying drawings, wherein:

FIG. 1 is a vertical section through a separation stage assembly, taken on line 1—1 of FIG. 2, with certain parts omitted for clarity;

FIG. 2 is a top or plan view of a separation stage assembly used in the inventive apparatus;

FIG. 3 is a schematic diagram of a complete analyzing apparatus;

FIGS. 4 and 5 are vertical sections, 45° apart, of a heat exchanger used in the inventive apparatus; and FIGS. 6 and 7 are curves useful in explaining the operation of the invention.

As previously stated, the analyzer includes three stages each of which makes a liquid-vapor separation at a controlled or constant temperature. Each of these three stages may comprise a flash pot. All three flash pots are similar in construction, and the construction thereof will now be described, with reference to FIGS. 1 and 2. A stainless steel tubular coil 1 is located so as to surround, but be radially spaced from, a cylindrical stainless steel chamber 2. The longitudinal axes of the coil and chamber are parallel, but not collinear. The coil and chamber are cast within an aluminum bronze cylinder 3 whose longitudinal axis is collinear with that of coil 1. One end 4 of coil 1 extends to the outside of the cylindrical casting or block 3, at one circular end face thereof which may be termed the top or upper face. In this connection, it is pointed out that the coil-chamber assembly has been laid on its side for FIG. 1. When in use, this liquid-vapor separation stage is positioned with the right-hand end face in FIG. 1 at the bottom, and with the longitudinal axes of the coil and chamber extending vertically. Thus, the left-hand end face in FIG. 1 is at the top, when the stage is in use. The coil end 4 provides the liquid inlet for the "flash pot" or coil-chamber assembly. The opposite end 5 of coil 1 is brought radially inwardly of the coil and connected to the interior of chamber 2, somewhat below the horizontal midplane of the latter. It may thus be seen that liquid entering the coil at 4 flows first through this coil and then into the chamber 2.

An electrical heater winding 6, in the form for example of a coil of asbestos-covered Nichrome wire, surrounds the cylinder 3. For the sake of simplicity, this winding is not shown in FIG. 2. Electric current is supplied to winding 6, to heat the cylinder (and also coil 1 and chamber 2) to an elevated temperature, such as to vaporize at least a portion of the liquid reaching chamber 2 by way of coil 1. As will hereinafter appear, the chamber 2 is maintained at a substantially constant elevated temperature, by means of the winding 6. The liquid is caused to flow through coil 1 prior to its reaching the chamber 2, to make sure that the liquid comes into equilibrium with the temperature of the chamber by the time it reaches the latter.

Figure 3:
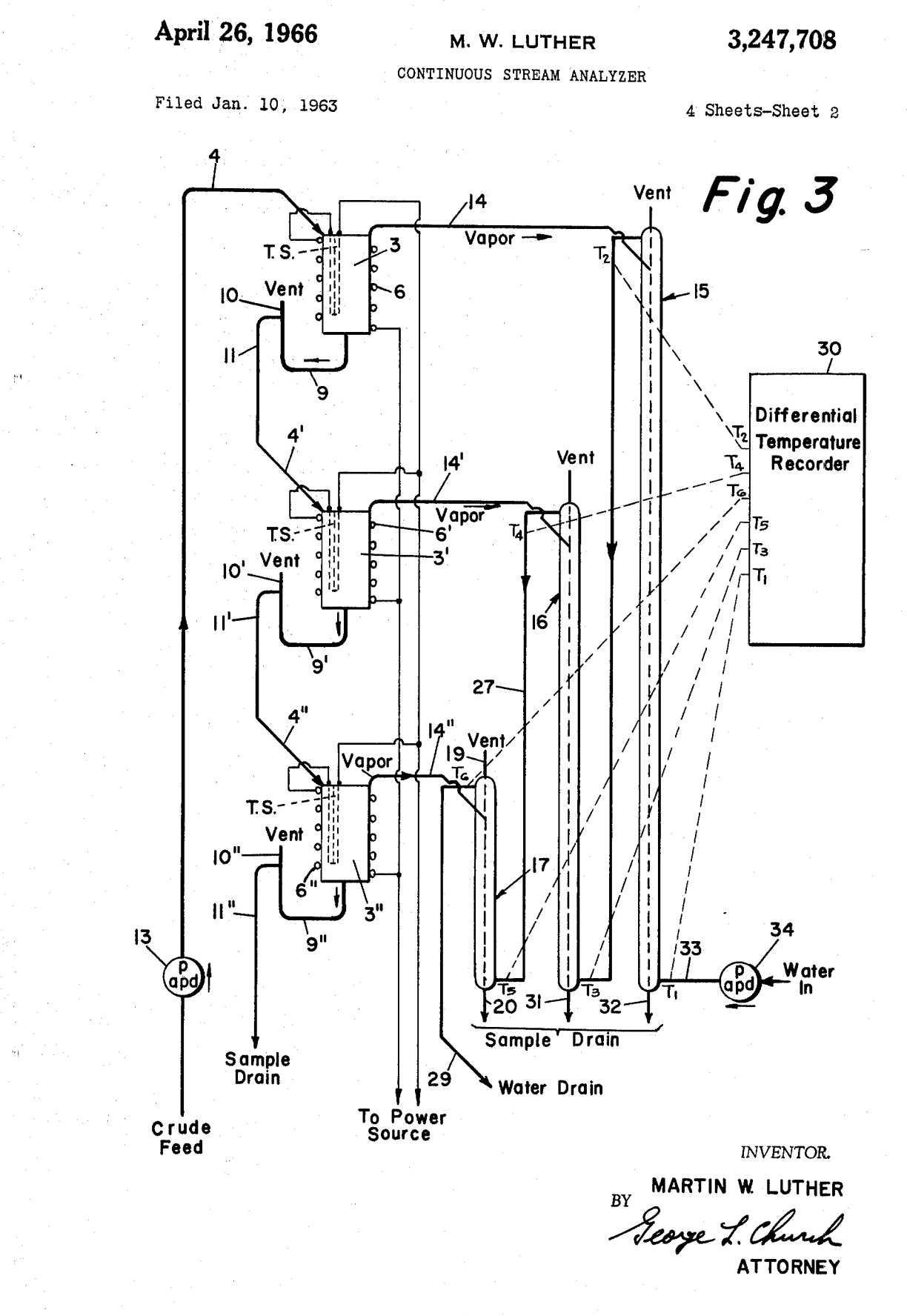

As shown in FIG. 2, an inclined circular hole 7 is drilled in the casting 3 for accommodation therein of an immersion-type thermostatic switch (not shown in FIG. 2, but indicated schematically at "T.S." in FIG. 3), this hole extending downwardly into block 3 from the upper face thereof. For purposes of clarity, hole 7 has been omitted from FIG. 1; it will be appreciated that it should normally appear in this figure. As shown in FIG. 3, the thermostatic switch is connected in series between a power source and winding 6, and this switch so controls the flow of electric current (from the power source to the heater winding) as to maintain the casting 3 (and thereby also the chamber 2) at a substantially constant temperature. This control of the electric current is effected, of course, by the opening and closing action of the thermostatic switch in response to the temperature of block 3.

To check the setting of the thermostatic switch which is mounted in hole 7, a circular hole 8 is drilled in the casting 3 to accommodate a thermocouple (not shown) which provides an indication proportional to the temperature of block 3 (and also of chamber 2). Hole 8 extends from the upper face of the casting downwardly parallel to the longitudinal axis of casting 3, and terminates short of the wall of hole 7, so that it does not intersect the latter.

The liquid outlet from chamber 2 is by way of a tube 9 the inner end of which is sealed through the bottom wall of chamber 2, which thus opens into the lower end of this chamber, and which extends to the outside of block 3 at the lower or bottom circular end face thereof. The outer portion of tube 9 extends downwardly and then back upwardly in U-shape to provide a liquid seal or trap which is vented at the outer end 10 of tube 9, which outer, upper end is open to the atmosphere. The outer end 10 of tube 9 bends over and extends a short distance horizontally or transversely to the axis of block 3, as indicated in FIG. 2.

At a location above the lowest point of the vented seal or trap described, but below the vent 10 and also below the bottom wall of chamber 2, a tube 11 extends out horizontally or transversely to the axis of block 3, as shown in FIG. 2. When the three chambers or stages are arranged in a series, the liquid effluent flows by way of tube 11 from the chamber shown in FIG. 1 to the next lower one of the series.

A pair of circular mounting recesses 12 are cut into block 3, one from each of the two opposite planar end faces thereof, these holes being centered on the longitudinal axis of the block.

As will be described in more detail hereinafter, the three stages, each of which is constructed as described in connection with FIGS. 1 and 2, are supported one above the other. This is illustrated schematically in FIG. 3, wherein the three blocks or cylinders 3, 3′, and 3″ are shown in that order, reading from top to bottom. The crude petroleum stream to be analyzed is fed at a controlled, constant rate to the liquid inlet pipe 4 of the upper stage, by means of an adjustable positive displacement pump ("diaphragm pump" or "gear pump") 13.

Liquid effluent from the upper stage flows by gravity to the middle stage, by way of liquid outlet pipe 9, the vented seal or trap (vented at 10), and tube 11, which latter is coupled to the liquid inlet pipe 4′ of the middle stage. Liquid effluent from the middle stage flows by gravity to the lower stage, by way of liquid outlet pipe 9′, the vented seal or trap (vented at 10′), and tube 11′, which latter is coupled to the liquid inlet pipe 4″ of the lower stage.

Liquid effluent from the lower stage leaves the analyzer. In this case, the flow is by gravity to a sample drain or sump, by way of liquid outlet pipe 9″, the vented seal or trap (vented at 10″), and tube 11″.

As indicated in FIG. 3, the thermostatic switch "T.S." of each stage is connected to control the flow of electric current to the heater winding of only its respective one of the stages. Thus, the control of the current flow through each of the three heater windings is entirely independent, and the three chambers may be maintained at temperatures different from each other. The first or uppermost stage is maintained at the lowest temperature, the second or middle stage at a higher temperature, and the third or lower stage at a still higher temperature. The temperature of each chamber is sufficiently high to vaporize at least a portion of the liquid reaching or fed into that chamber.

Referring again to FIGS. 1 and 2, the vapor outlet from chamber 2 is by way of a tube 14 the inner end of which is sealed through the top wall of chamber 2, which thus opens into the upper end of this chamber, and which extends to the outside of block 3 at the upper planar end face thereof. The outer portion of tube 14 extends horizontally or transversely to the axis of block 3.

Referring again to FIG. 3, the vapor from each of the three liquid-vapor separation stages is conducted to a respective heat exchanger. The upper stage vapor outlet tube 14 leads to a heat exchanger 15, the middle stage vapor outlet tube 14′ leads to a heat exchanger 16, while the lower stage vapor outlet tube 14″ leads to a heat exchanger 17.

Refer now to FIGS. 4 and 5, which are detailed views showing the construction of the lower heat exchanger 17. The exchangers 15 and 16 are generally similar in construction to exchanger 17, although the lengths of the three exchangers are different, as indicated in FIG. 3. Speaking generally, the exchanger 17 is supplied with a metered stream of cooling liquid (e.g., water), and this liquid is sufficiently cool to condense all of the hydrocarbon vapor fed to this exchanger.

FIGS. 4 and 5 depict the exchanger 17, the two figures being vertical sections of the exchanger taken 45° apart in a horizontal plane. First referring to FIG. 5, the body of the exchanger 17 comprises an elongated glass tube 18 whose upper end 19 is bent about 90° to the longitudinal axis of tube 18 and is open to the atmosphere. This provides an atmospheric vent at the upper end of tube 18. Condensation of the vapor occurs in exchanger 17, as previously stated, and the liquid condensate flows by gravity out the lower end 20 of tube 18, to a sample drain or sump.

Vapor is fed from the third or lower liquid-vapor separation stage into tube 18 by means of an inclined tube 21 (inclined at an angle of 45°, for example, to the axis of tube 18) having the same diameter as tube 18. One end of tube 21 is sealed into tube 18, and the other end of tube 21 is provided with a ball 22 which mates with a socket (not shown) provided at the outer end of the third stage vapor outlet tube 14″. Thus, by means of tubes 14″ and 21, the vapor produced in the third stage (heated) chamber is conducted to the third (or bottom) exchanger 17.

Refer now to FIG. 4. A suitable portion of the length of tube 18 is provided with a surrounding jacket 23, through which a cooling liquid (e.g., water) can be circulated. A resistance thermometer well 24 is provided at the lower end of jacket 23 by fusing one end of a length of tubing to this jacket, and a resistance thermometer well 25 is provided at the upper end of jacket 23 by fusing one end of a length of tubing to this jacket. The axes of wells 24 and 25 are parallel to each other and are both inclined at a suitable angle (say 45°) to the common longitudinal axis of tube 18 and jacket 23. It should be apparent that the axes of wells 24 and 25 lie in a vertical plane which extends at 45° to the vertical plane in which lies the axis of tube 21. In use of the analyzer, the wells 24 and 25 each receive and support therein a respective resistance thermometer (not shown). The thermometer in well 24 measures a temperature $T_5$ (see FIG. 3), while the thermometer in well 25 measures a temperature $T_6$.

A water jacket 26 surrounds thermometer well 24, one end of this jacket opening into and communicating with jacket 23, near the lower end of the latter. The other or outer end of jacket 26 communicates with a water inlet pipe 27. A water jacket 28 surrounds thermometer well 25, one end of this jacket opening into and communicating with jacket 23, near the upper end of the latter. The other or outer end of jacket 28 communicates with a water outlet pipe 29, which leads to a drain or sump (see FIG. 3). In exchanger 17, the water enters via pipe 27, then proceeds through jacket 26 (which surrounds thermometer well 24), through jacket 23 (which surrounds tube 18), through jacket 28 (which surrounds thermometer well 25), and leaves via pipe 29. The water jackets 26 and 28 around thermometer wells 24 and 25 are of sufficient length to discourage the flow of heat from ambient into the thermometers which are in these wells.

The vapor produced in the third or lower liquid-vapor separation stage is conducted to exchanger 17, where all of it is condensed (in tube 18) with a metered stream of water which flows through jacket 23, from the lower end to the upper end thereof. The resistance thermometer in well 24 measures the temperature $T_5$ of the water flowing to exchanger 17, while the resistance thermometer in well 25 measures the (higher) temperature $T_6$ of the water flowing from exchanger 17. The difference in resistance of the resistance thermometers in these two wells (which may be represented by $T_6-T_5$ is a measure of the rate of vapor production in the third or lower liquid-vapor separation stage, i.e., in the lower heated (flash) chamber. In other words, the temperature differential of the water in traveling through exchanger 17 is an indication of the rate of vapor production in the third or lower stage chamber. The temperature differential of the water varies directly with the rate of vapor production. That is to say, the higher the rate of vapor production, the greater will be the differential temperature of the water, and vice versa.

Now refer to FIG. 3. The resistance thermometers measuring $T_5$ and $T_6$ are connected to appropriate terminals on a three-point differential temperature recorder 30, so that the difference in resistance between this pair of thermometers (which are in effect immersed in the water to and from the exchanger 17) is recorded by one of the "points" of recorder 30. That is to say, one of the "points" of recorder 30 records the temperature differential $T_6-T_5$.

The exchanger 16 is constructed quite similarly to exchanger 17, previously described. Its main water jacket is longer than that of exchanger 17, however. Exchanger 16 has a water inlet at the lower end of the exchanger, a water outlet at the upper end of the exchanger, a pair of wells for resistance thermometers (one measuring the temperature $T_3$ of the water flowing to this exchanger and the other measuring the temperature $T_4$ of the water flowing from this exchanger), and a vapor inlet. In the case of exchanger 16, the vapor inlet is coupled to the vapor outlet line 14' of the second or middle liquid-vapor separation stage. The vapor produced in the second or middle stage is conducted to exchanger 16, where it is all condensed. The liquid condensate flows out the lower end 31 of the exchanger hydrocarbon tube, to a sample drain or sump.

The difference in resistance of the resistance thermometers in the two wells of exchanger 16 (one measuring $T_3$ and the other $T_4$, and the difference being represented by $T_4-T_3$) is a measure of the rate of vapor production in the second or middle liquid-vapor separation stage, i.e., in the middle heated (flash) chamber. The resistance thermometers measuring $T_3$ and $T_4$ are connected to appropriate terminals on recorder 30, such that one of the "points" of this recorder records the temperature differential $T_4-T_2$.

The exchanger 15 is also constructed quite similarly to exchanger 17. Its main jacket is longer than that of exchanger 17, however, and is also longer than that of exchanger 16. Exchanger 15 has a water inlet at the lower end of the exchanger, a water outlet at the upper end of the exchanger, a pair of wells for resistance thermometers (one measuring the temperature $T_1$ of the water flowing to this exchanger and the other measuring the temperature $T_2$ of the water flowing from this exchanger), and a vapor inlet. In the case of exchanger 15, the vapor inlet is coupled to the vapor outlet line 14 of the first or upper liquid-vapor separation stage. The vapor produced in the first or upper stage is conducted to exchanger 15, where it is all condensed. The liquid condensate flows out the lower end 32 of the exchanger hydrocarbon tube, to a simple drain or sump.

The difference in resistance of the resistance thermometers in the two wells of exchanger 15 (one measuring $T_1$ and the other $T_2$, and the difference being represented by $T_2-T_1$) is a measure of the rate of vapor production in the first or upper liquid-vapor separation stage, i.e., in the upper heated (flash) chamber. The resistance thermometers measuring $T_1$ and $T_2$ are connected to appropriate terminals on recorder 30, such that one of the "points" of this recorder records the temperature differential $T_2-T_1$.

It will be appreciated that each of the heat exchangers 15, 16, and 17 serves as a condenser, to condense the vapor (from the respective liquid-vapor separation stage) supplied thereto. A metered stream of cooling liquid (water) is supplied to each of these exchangers, in a manner which will now be described. Water is fed at a controlled, constant rate to a water supply pipe 33 by means of an adjustable positive displacement pump ("diaphragm pump" or "gear pump") 34. The stream of water flows through the jacket around the resistance thermometer measuring $T_1$, thence upwardly through the main jacket of exchanger 15, through the jacket around the resistance thermometer measuring $T_2$, through the jacket around the resistance thermometer measuring $T_3$, upwardly through the main jacket of exchanger 16, through the jacket around the resistance thermometer measuring $T_4$, through water pipe 27, through thermometer jacket 26 of exchanger 17, upwardly through main jacket 23 of exchanger 17, through thermometer jacket 28 of exchanger 17, and finally through water outlet pipe 29 to a drain. The water flow through this path is known and constant (i.e., it is metered), and it may be adjusted or set by adjustment of pump 34.

Foamed glass insulation (not shown) is applied to the analyzer apparatus of the invention to prevent (1) loss of heat in the vapor lines 14, 14', and 14" between the separation stage castings and the exchangers, and (2) flow of heat into the water-jacketed condensers (exchangers). It is important that each vapor stream be maintained at its saturation temperature (i.e., the temperature at which the respective liquid-vapor separation was made), and that the water flowing through the exchangers be heated only by heat exchange with the vapor.

The analyzing apparatus of this invention, including the three liquid-vapor separation stage castings, the three heat exchangers, and the internal piping, tubing, electrical wiring, etc., as shown in FIG. 3, but excluding pumps 13 and 34 and recorder 30, is assembled within a domed cover which at its periphery threadedly engages a base through which various connections are made. Inside this cover, which is arranged to constitute an explosion-proof housing, the castings 3, 3', and 3" are supported one above the other by means of rigid pieces of tubing which fit into the recesses 12 and extend between adjacent castings, the lowermost casting being supported above the aforesaid base by means of a similar piece of tubing. The crude feed pipe, the four sample drain pipes, the cooling water feed pipe, the water drain pipe, the electrical power leads for the casting heaters, the resistance thermometer output leads, and the electrical leads for the checking thermocouples, all must pass through the aforesaid base.

The selection of the temperatures at which each of the three liquid-vapor separation stages are to operate on an actual crude or crude mix is entirely arbitrary, except that the temperatures should increase in going from the first stage to the second stage and also from the second stage to the third stage, and that the temperatures should be sufficient to obtain a vapor which is the approximate equivalent of the refinery products with respect to the ASTM 50% boiling point.

A typical example will now be given, to illustrate the performance of the analyzer of this invention. In this example, the stage temperatures were selected to produce vapors from the first, second, and third stages equal in yield to the distillate products from an actual refinery fractionation tower. In this case, the distillate yields from a particular crude (herein termed "K" crude) were selected because this crude is the major constituent in the blends of crudes actually charged to the tower. Accordingly, the temperature of the first or upper stage of the analyzer was increased gradually until the vapor removed therefrom equaled the gasoline yield from the tower when using "K" crude, 18.4%; the same was done with the second or middle stage so as to equal the naphtha yield, 8.0%; likewise with the third or lower stage to equal the furnace oil yield, 5.6%. The temperatures attained at the proper yields (as measured by the respective checking thermocouples, for example) were respectively 338° F., 525° F., and 606° F.

Performance of the analyzer was demonstrated by switching from "K" crude, which is known to give low distillate yields in the tower, to another crude ("SM") which is known to give higher distillate yields. The stage temperatures were, of course, maintained constant. Results obtained are tabulated below:

|  | "K" Crude | "SM" Crude |
| --- | --- | --- |
| Operating Temp., First Stage, ° F | 338 | 338 |
| Operating Temp., Second Stage, ° F | 525 | 525 |
| Operating Temp., Third Stage, ° F | 606 | 606 |
| Water Flow to Exchangers, cc./min | 53 | 53 |
| Crude Flow to First Stage, cc./min | 25 | 25 |
| Temp. of Water Fed to First Exchanger, ° F | 60 | 60 |
| Differential Temp., First Exchanger, ° F | 20 | 49 |
| Differential Temp., Second Exchanger, ° F | 12 | 18 |
| Differential Temp., Third Exchanger, ° F | 10 | 11 |
| Condensed Vapor, First Stage, cc./min | 4.6 | 11.3 |
| Condensed Vapor, Second Stage, cc./min | 2.0 | 3.2 |
| Condensed Vapor, Third Stage, cc./min | 1.4 | 1.6 |
| Vapor Yield, First Stage, Vol. percent | 18.4 | 45.2 |
| Vapor Yield, Second Stage, Vol. percent | 8.0 | 12.8 |
| Vapor Yield, Third Stage, Vol. percent | 5.6 | 6.4 |

The relation between differential temperatures and the corresponding vapor yields (in volume percent) from the analyzer is shown by FIG. 6 to be approximately linear. The actual condensed vapor flows (in cc. min.) were determined from the time required to reach a certain volume in a graduated cylinder held under respective ones of the pipes 20, 31, and 32 (FIG. 3). This procedure may be followed on any installation, in order to calibrate the analyzer.

It will be recalled that the operating temperature of each analyzer stage was set, by a run on the base crude ("K"), to produce vapor yields equalling fractionation tower yields. See the dotted-line curve in FIG. 7. The results given by the analyzer cannot be compared with fractionation tower results on "SM" crude, inasmuch as this crude was never run alone in the refinery. A comparison, however, can be made with apparent true boiling point yields. This comparison is shown in FIG. 7, by means of the solid-line curve.

The apparent true boiling point yields for "SM" crude were determined by first selecting, on the "K" crude true boiling point curve (the latter having been obtained by a true boiling point distillation of "K" crude, in the laboratory), "cut" temperatures corresponding to tower yields when using "K" crude. These "cut" temperatures were then applied to a "SM" crude true boiling point curve, to find the apparent true boiling point yields for this crude.

It was previously stated, by way of example, that a fourth distillate product (termed "gas oil") was produced in a typical crude petroleum distillation unit (fractionation tower). The question may now be raised as to why it was not considered necessary to add a fourth stage to the analyzer of this invention, to predict the yield of gas oil. In practice, it is advantageous to distill over as much gas oil as possible, limited only by decomposition temperatures or by available heat. These considerations establish the "tail" of the gas oil, rather than a specification on boiling range. Thus, the problem of maintaining the gas oil "on specification" does not arise.

The invention claimed is:

1. In apparatus for analyzing a stream of liquid, a plurality of chambers, separate means for maintaining each of said chambers at a substantially constant elevated temperature such as to vaporize at least a portion of the liquid fed thereto, means arranging said chambers in a series with each chamber save the first receiving bottoms from the preceding chamber, means for feeding at a constant rate to said first chamber the liquid stream to be analyzed, and means for measuring the actual rate of vapor production in each chamber, said last-mentioned means including a separate heat exchanger for each chamber, means for feeding a metered stream of cooling liquid through all of said exchangers, means for feeding all of the vapor actually produced in each chamber to its corresponding exchanger, and means for measuring the temperature differential of said cooling liquid in traveling through each respective exchanger.

2. In apparatus for analyzing a stream of liquid, a plurality of chambers, a separate electrical heater winding surrounding each respective chamber, separate means controlling the flow of current through each of said windings to maintain each of said chambers at a substantially constant elevated temperature such as to vaporize at least a portion of the liquid fed thereto, means arranging said chambers in a series with each chamber save the first receiving bottoms from the preceding chamber, means for feeding at a constant rate to said first chamber the liquid stream to be analyzed, and means for measuring the actual rate of vapor production in each chamber, said last-mentioned means including a separate heat exchanger for each chamber, means for feeding a metered stream of cooling liquid through all said exchangers, means for feeding all of the vapor actually produced in each chamber to its corresponding exchanger, and means for measuring the temperature differential of said cooling liquid in traveling through each respective exchanger.

References Cited by the Examiner

UNITED STATES PATENTS 1,349,409  8/1920  Crawford _____ 73—193 X
1,701,988  2/1929  Torrey et al. ____ 202—172 X
3,095,739  7/1963  Doolittle _____ 73—190
3,123,541  3/1964  Donnell _____ 73—17 X

OTHER REFERENCES

German application 1,122,962, Feb. 1, 1962.

RICHARD C. QUEISSER, Primary Examiner.

ROBERT L. EVANS, Examiner.